United States Patent
Liu

(10) Patent No.: US 11,419,006 B2
(45) Date of Patent: Aug. 16, 2022

(54) USER DATA TRANSPORT OVER CONTROL PLANE IN COMMUNICATION SYSTEM USING DESIGNATED PAYLOAD CONTAINER TYPES

(71) Applicant: Nokia Technologies Oy, Espoo (FI)

(72) Inventor: Jennifer J.-N. Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/937,118

(22) Filed: Jul. 23, 2020

(65) Prior Publication Data

US 2021/0037415 A1    Feb. 4, 2021

Related U.S. Application Data

(60) Provisional application No. 62/879,875, filed on Jul. 29, 2019.

(51) Int. Cl.
| | |
|---|---|
| *H04W 28/06* | (2009.01) |
| *H04W 4/70* | (2018.01) |
| *H04W 84/04* | (2009.01) |

(52) U.S. Cl.
CPC ............ *H04W 28/06* (2013.01); *H04W 4/70* (2018.02); *H04W 84/042* (2013.01)

(58) Field of Classification Search
CPC ...... H04W 28/06; H04W 4/70; H04W 84/042
See application file for complete search history.

(56) References Cited

U.S. PATENT DOCUMENTS

| | | |
|---|---|---|
| 2013/0083726 A1 | 4/2013 | Jain et al. |
| 2019/0090123 A1 | 3/2019 | Abraham et al. |
| 2019/0200414 A1 | 6/2019 | Abraham et al. |

(Continued)

OTHER PUBLICATIONS

Interdigital Inc et al.: "User Plane Activation for PDU Sessions with CP Optimization Enabled", 3GPP Draft; S2-1903353 CI0T_DISC UP Activation, 3rd Generation Partnership Project (3 GPP), Mobile Competence Centre; 650, Route Des Lucioles; F-06921 Sophia-Antipolis Cedex; France; vol. SA WG2, No. Xi'an, China; Apr. 8, 2019-Apr. 12, 2019; Apr. 2, 2019; XP051791516; Retrieved from the Internet: URL: http://www.3 gpp.org/ftp/tsg%5Fsa/WG2%5FArch/TSGS2%5F132%5FXAn/Docs/S2%2D1903353%2Ezip [retrieved on Apr. 2, 2019].

(Continued)

*Primary Examiner* — Diane D Mizrahi
(74) *Attorney, Agent, or Firm* — Alston & Bird LLP

(57) ABSTRACT

Described are systems, devices, methods, and computer program products for user data transport over a control plane in a communication system. For example, a method comprises determining a size of user data to be transmitted over a control plane between user equipment and at least one network entity of a communication system. The method also comprises, in response to determining that the size of the user data to be transmitted is below at least a threshold for small data transport, generating a control plane message comprising the user data to be transmitted in a small data container for transport of user data over the control plane. The method further comprises transmitting the generated control plane message between the user equipment and the at least one network entity of the communication system.

20 Claims, 15 Drawing Sheets

(56) References Cited

U.S. PATENT DOCUMENTS

2019/0313468 A1* 10/2019 Talebi Fard .......... H04W 60/04
2020/0404734 A1* 12/2020 Watfa ................... H04W 76/30

OTHER PUBLICATIONS

International Search Report and Written Opinion for International Patent Application No. PCT/EP2020/071385 dated Sep. 18, 2020, 14 pages.

"3rd Generation Partnership Project; Technical Specification Group Core Network and Terminals; Non-Access-Stratum (NAS) Functions Related to Mobile Station (MS) in Idle Mode (Release 16)" 3GPP TS 23.122 V16.2.0 (Jun. 2019), 72 pages.

"3rd Generation Partnership Project; Technical Specification Group GSM/EDGE Radio Access Network; Cellular System Support for Ultra-Low Complexity and Low Throughput Internet of Things (CIoT) (Release 13)" 3GPP TR 45.820 v13.1.0 (Nov. 2015), 495 pages.

"3rd Generation Partnership Project; Technical Specification Group Services and System Aspects; General Packet Radio Service (GPRS) Enhancements for Evolved Universal Terrestrial Radio Access Network (E-UTRAN) Access (Release 16)" 3GPP TS 23.401 v16.2.0 (Mar. 2019), 418 pages.

"3rd Generation Partnership Project; Technical Specification Group Services and System Aspects; Security Architecture and Procedures for 5G System (Release 15)" 3GPP TS 33.501 v15.4.0 (Mar. 2019), 187 pages.

"3rd Generation Partnership Project; Technical Specification Group Services and System Aspects; System Architecture for the 5G System; Stage 2 (Release 16)" 3GPP TS 23.501 v16.0.2 (Apr. 2019), 317 pages.

Office Action for Bangladesh Application No. -233/2020/4945 dated Oct. 13, 2021, 1 page.

Office Action for Taiwanese Application No. 109125189 dated Sep. 9, 2021, 5 pages.

Office Action for Bangladesh Application No. -233/2020/4945 dated Apr. 27, 2022, 2 pages.

Office Action for Indian Application No. 202227003912 dated Jul. 7, 2022, 6 pages.

* cited by examiner

```
CIoT small data container contents (octet 3 to octet n)

These octets include user data to be delivered between UE and AMF.

PDU session identity (octet 3, bits 1 to 4)
Bits
4 3 2 1
0 0 0 0   No PDU session identity assigned
0 0 0 1   PDU session identity value 1
0 0 1 0   PDU session identity value 2
0 0 1 1   PDU session identity value 3
0 1 0 0   PDU session identity value 4
0 1 0 1   PDU session identity value 5
0 1 1 0   PDU session identity value 6
0 1 1 1   PDU session identity value 7
1 0 0 0   PDU session identity value 8
1 0 0 1   PDU session identity value 9
1 0 1 0   PDU session identity value 10
1 0 1 1   PDU session identity value 11
1 1 0 0   PDU session identity value 12
1 1 0 1   PDU session identity value 13
1 1 1 0   PDU session identity value 14
1 1 1 1   PDU session identity value 15

Downlink data expected (DDX) (octet 3, bits 5 to 6)
Bits
6 5
0 0   No information available
0 1   No further uplink or downlink data transmission subsequent to the uplink data
      transmission is expected
1 0   Only a single downlink data transmission and no further uplink data
      transmission subsequent to the uplink data transmission is expected
1 1   reserved Bits 7 and 8 of octet 3 are spare and shall be encoded as zero.

data contents (octet 4 to octet n)
```

FIG. 9

CIoT user data container contents (octet 4 to octet n)

These octets include user data to be delivered between UE and AMF.

PDU session identity (octet 4, bits 1 to 4)
Bit
4 3 2 1
0 0 0 0   No PDU session identity assigned
0 0 0 1   PDU session identity value 1
0 0 1 0   PDU session identity value 2
0 0 1 1   PDU session identity value 3
0 1 0 0   PDU session identity value 4
0 1 0 1   PDU session identity value 5
0 1 1 0   PDU session identity value 6
0 1 1 1   PDU session identity value 7
1 0 0 0   PDU session identity value 8
1 0 0 1   PDU session identity value 9
1 0 1 0   PDU session identity value 10
1 0 1 1   PDU session identity value 11
1 1 0 0   PDU session identity value 12
1 1 0 1   PDU session identity value 13
1 1 1 0   PDU session identity value 14
1 1 1 1   PDU session identity value 15

Downlink data expected (DDX) (octet 4, bits 5 to 6)
Bits
6 5
0 0   No information available
0 1   No further uplink or downlink data transmission subsequent to the uplink data transmission is expected
1 0   Only a single downlink data transmission and no further uplink data transmission subsequent to the uplink data transmission is expected
1 1   reserved Bits 7 and 8 of octet 4 are spare and shall be encoded as zero.

data contents (octet 5 to octet n)

FIG. 12

CONTROL PLANE SERVICE REQUEST message content

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Control plane service request message identity | Message type 9.7 | M | V | 1 |
| | Control plane service type | Control plane service type 9.9.3.47 | M | V | 1/2 |
| | ngKSI | NAS key set identifier 9.11.3.32 | M | V | 1/2 |
| 8- | Payload container type | Payload container type 9.11.3.40 | O | TV | 1 |
| 7B | Payload container | Payload container 9.11.3.39 | C | TLV-E | 4-65538 |
| 12 | PDU session ID | PDU session identity 2 9.11.3.41 | O | TV | 2 |
| 50 | PDU session status | PDU session status 9.11.3.44 | O | TLV | 4-34 |
| F- | Release assistance indication | Release assistance indication 9.11.3.y | O | TV | 1 |
| 40 | Uplink data status | Uplink data status 9.11.3.57 | O | TLV | 4-34 |
| 71 | NAS message container | NAS message container 9.11.3.33 | O | TLV-E | 4-n |

Information Elements to be ciphered are put into NAS message container the value part of the NAS message container IE is ciphered using the ciphering key from the UE's NAS security context

FIG. 18

USER DATA TRANSPORT OVER CONTROL PLANE IN COMMUNICATION SYSTEM USING DESIGNATED PAYLOAD CONTAINER TYPES

CROSS-REFERENCE TO RELATED APPLICATIONS

This application claims priority to, and the benefit of, U.S. Provisional Patent Application No. 62/879,875, filed Jul. 29, 2019, entitled "User Data Transport Over Control Plane in Communication System Using Designated Payload Container Types," the entire contents of each of which are hereby incorporated herein by reference in their entireties for all purposes.

FIELD

The field relates generally to communication systems, and more particularly, but not exclusively, to control plane communications within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V16.0.2, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.4.0, entitled "Technical Specification Group Services and System Aspects; Security Architecture and Procedures for the 5G System," the disclosure of which is incorporated by reference herein in its entirety, further describes security management details associated with a 5G network.

Network performance is an important consideration in any communication system. For example, processing of control plane messages received by the core network from user equipment can have a significant impact on network performance. However, management of such communications presents several challenges in existing 5G approaches.

SUMMARY

Illustrative embodiments provide improved techniques for user data transport over a control plane in a communication system using designated payload container types.

For example, in one illustrative embodiment, a method comprises determining a size of user data to be transmitted over a control plane from user equipment to at least one network entity of a communication system. The method also comprises, in response to determining that the size of the user data to be transmitted is below at least a threshold for small data transport, generating a control plane message comprising the user data to be transmitted in a payload container dedicated to transport of small user data over the control plane, hereinafter referred to as small data container. The method further comprises transmitting the generated control plane message from the user equipment to the at least one network entity of the communication system.

In another illustrative embodiment, a method comprises determining a size of user data to be transmitted from at least one network entity of a communication system over a control plane to the user equipment. The method also comprises, in response to determining that the size of the user data to be transmitted is below at least a threshold for small data transport, generating a control plane message comprising the user data to be transmitted in a small data container. The method further comprises transmitting the generated control plane message to the user equipment from the at least one network entity of the communication system.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 9 illustrates contents of the small data container information element, according to an illustrative embodiment.

FIG. 12 illustrates contents of the user data container information element, according to an illustrative embodiment.

FIG. 18 illustrates data protection for small data containers for user equipment in an idle mode, according to an illustrative embodiment.

DETAILED DESCRIPTION

Figure 1:
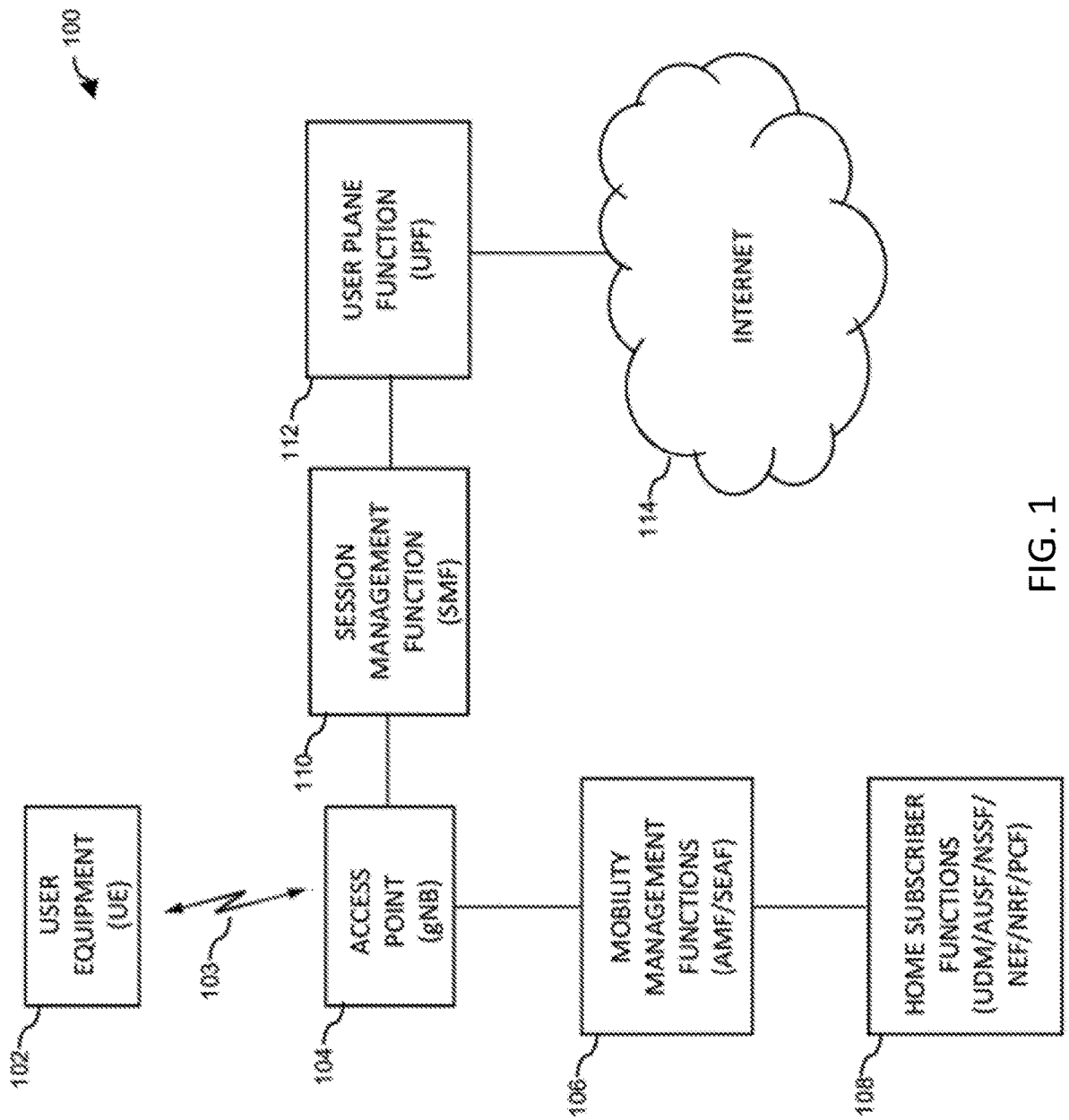
FIG. 1 illustrates a communication system with which one or more illustrative embodiments are implemented.

Embodiments will be illustrated herein in conjunction with example communication systems and associated techniques for user data transport over a control plane in a communication system using designated payload container types. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems. Note that 3GPP stands for 3rd Generation Partnership Project which is a standards organization that develops protocols for mobile telephony and the like.

In accordance with illustrative embodiments implemented in a 5G communication system environment, one or more 3GPP technical specifications (TS) and technical reports (TR) provide further explanation of user equipment and network entities (e.g., network elements, network functions, etc.) and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. For example, 5G Technical Specification (TS) 23.401, V16.2.0, entitled "Technical Specification Group Services and System Aspects; General Packet Radio Service (GPRS) Enhancements for Evolved Universal Terrestrial Radio Access Network (E-UTRAN) Access," the disclosure of which is incorporated by reference herein in its entirety, describes general principles for Cellular IoT (CIoT) optimizations, an optimization with which one or more illustrative embodiments will be described below. However, while illustrative embodiments are well-suited for implementation associated with the above-mentioned 5G-related 3GPP standards, alternative embodiments are not necessarily intended to be limited to any particular standards.

Furthermore, illustrative embodiments may be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to control plane message management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used in other embodiments to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and, more particularly, supports CIoT optimization as mentioned above and as will be further explained herein. In such embodiments when the UE is an IoT device, non-limiting examples of such devices may include sensors, monitors, actuators, robotic devices and/or other machine-based devices. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in other embodiments are implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

While illustrative embodiments will be described below from the perspective of control plane communications between the UE and the AMF in a 5G system environment, it is to be understood that control plane message management techniques described herein can be applied in a straightforward manner to communication systems other than 5G systems, by way of example only, LTE or other 3GPP systems, as well as any appropriate non 3GPP systems. By way of example only, in an alternative embodiment, where the communication system is an LTE system, the mobility management function is performed by a Mobility Management Entity (MME).

Returning to FIG. 1, AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), and Policy Control Function (PCF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane typically carries network user traffic (user data) while the control plane (CP) typically carries control signaling traffic (control data). SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between network functions (NFs) and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
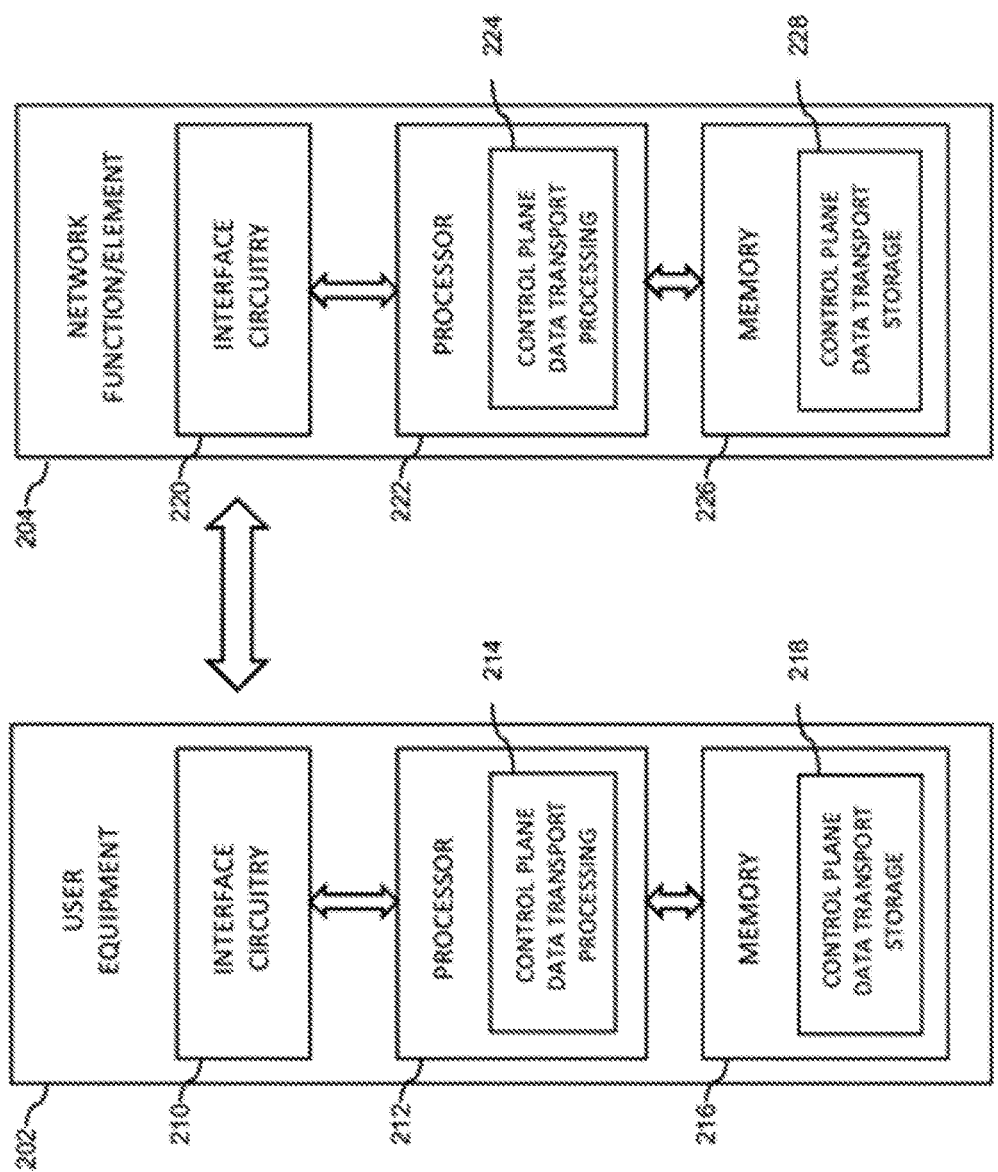
FIG. 2 illustrates processing architectures for user equipment and a network entity with which one or more illustrative embodiments are implemented.

Illustrative embodiments provide improved techniques for user data transport over a control plane of a communication system, particularly involving CIoT optimizations. FIG. 2 is a block diagram of processing architectures 200 of two participants, i.e., user equipment and a network function/element (e.g., AMF), in a control plane-based user data transport methodology in an illustrative embodiment. It is to be appreciated that more than two participants may be involved in a control plane-based user data transport methodology according to illustrative embodiments. As such, FIG. 2 illustrates processing architectures associated with any two of the participants that directly and/or indirectly communicate. Therefore, in illustrative embodiments, each participant in a control plane-based user data transport methodology is understood to be configured with the processing architecture shown in FIG. 2.

As shown, user equipment 202 comprises a processor 212 coupled to a memory 216 and interface circuitry 210. The processor 212 of the user equipment 202 includes a control plane data transport processing module 214 that may be implemented at least in part in the form of software executed by the processor. The processing module 214 performs control-plane-based user data transport, as well as other operations, described in conjunction with subsequent figures and otherwise herein. The memory 216 of the user equipment 202 includes a control plane data transport storage module 218 that stores data generated or otherwise used during control plane-based user data transport and other operations.

As further shown, a network function/element 204 comprises a processor 222 coupled to a memory 226 and interface circuitry 220. The processor 222 of the network function/element 204 includes a control plane data transport processing module 224 that may be implemented at least in part in the form of software executed by the processor 222. The processing module 224 performs control-plane based user data transport, as well as other operations, described in conjunction with subsequent figures and otherwise herein. The memory 226 of the network function/element 204 includes a control plane data transport storage module 228 that stores data generated or otherwise used during control-plane based user data transport and other operations.

The processors 212 and 222 of the respective user equipment 202 and network function/element 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective user equipment 202 and network function/element 204 may be used to store one or more software programs that are executed by the respective processors 212 and 222 to implement at least a portion of the functionality described herein. For example, control-plane based user data transport operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective user equipment 202 and network function/element 204 illustratively comprise transceivers or other communication hardware or firmware that allows the associated system elements to communicate with one another in the manner described herein.

It is apparent from FIG. 2 that user equipment 202 is configured for communication with network function/element 204 and vice-versa via their respective interface circuitries 210 and 220. This communication involves user equipment 202 sending data to network function/element 204, and network function/element 204 sending data to user equipment 202. However, in alternative embodiments, other network elements or other components may be operatively coupled between, as well as to, user equipment 202 and/or network function/element 204. The term "data" as used herein is intended to be construed broadly, so as to encompass any type of information that may be sent between control plane message management participants including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

Given the above illustrative architectures, illustrative embodiments of control plane-based user data transport methodologies will be further described below in the context of IoT connectivity in 3GPP networks.

3GPP has defined a set of technologies for enabling IoT connectivity in 3G and 4G deployments, including via Extended Coverage Global System for Mobile Communications (GSM) IoT (EC-GSM-IoT), Narrowband IoT (NB-IoT), and enhanced Machine Type Communication (eMTC). NB-IoT and eMTC radio technologies will be used for 5G CIoT deployment.

As mentioned above, general principles of CIoT optimizations are described in the above-referenced TS 23.401 (e.g., clause 4.10: Introduction of C-IoT Evolved Packet System (EPS) Optimizations). Two types of communication bearer optimizations are specified. One optimization is based on User Plane (UP) transport of user data and is referred to as UP CIoT EPS optimization. Another optimization, known as Control Plane (CP) CIoT EPS optimization, transports user data or Short Message Service (SMS) messages via the mobility management element (MME in LTE or AMF in 5G) by encapsulating them in the Non-Access Stratum (NAS), reducing the total number of control plane messages when handling a short data transaction. NAS is the functional layer in UMTS and LTE wireless telecom protocol stacks between the core network and user equipment. This layer is used to manage the establishment of communication sessions and to maintain continuous communications with the user equipment as it roams.

When the UE attaches to the network, the UE includes, in a preferred network behavior indication, the network behavior that the UE can support and what it would prefer to use, such as whether CP CIoT EPS optimization is supported or whether UP CIoT EPS optimization is supported.

When CP CIoT EPS optimization is supported, CIoT UEs can send and receive small data packets over the NAS signalling control plane. There are some benefits when the CIoT UEs uses the control plane for communication since the control plane is not busy all the time and has a relatively low rate of packets.

A key requirement for IoT devices is battery life. Both Long Term Evolution (LTE) Category M1 (Cat-M1) and NB-IoT are required to significantly decrease power consumption over broadband cellular technologies. Battery life may be important for various low cost sensor and metering type IoT devices. In NB-IoT, for example, the maximum battery life is expected to reach 10 years even under extreme coverage conditions. Ideally, the battery for such IoT devices should last for the entire expected life cycle of the device to avoid costly maintenance.

Figure 3:
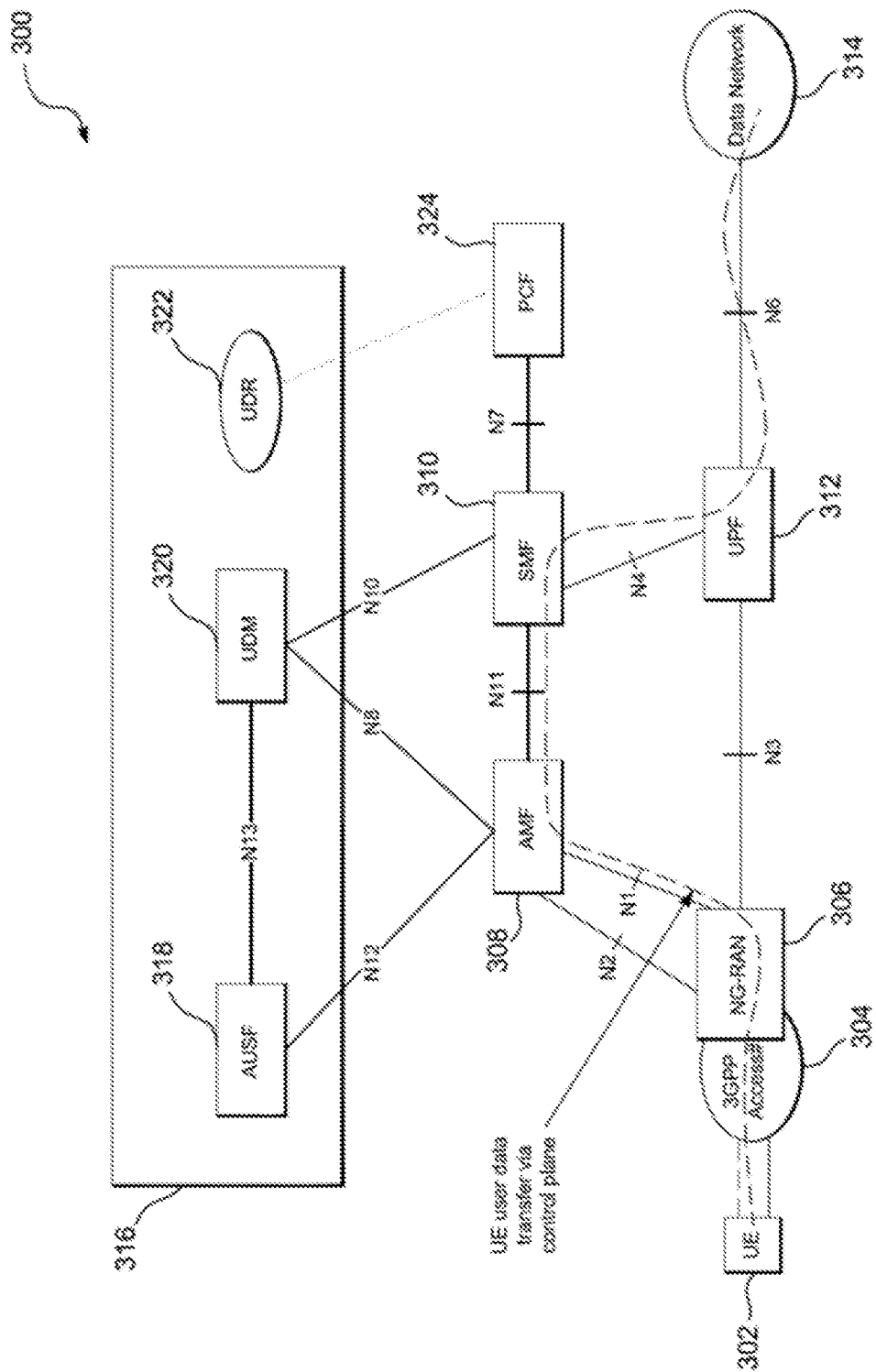
FIG. 3 illustrates part of a communication system, with which one or more illustrative embodiments are implemented, where user equipment transfers data via a control plane to a data network.

In one example embodiment, consider the scenario where a 5G UE 302 transfers user data via the control plane (e.g., as illustrated by the dashed line in FIG. 3) to a data network 314 (e.g., a Packet Data Network (PDN) such as the Internet) over the N6 interface in a 5G communication system. The UE 302 connects to AMF 308 via 3GPP access point 304 and NG Radio Access Network (NG-RAN) 306 and provides the user data over the N1 interface. The AMF 308 provides the user data to the SMF 310 over the N11 interface, and the SMF provides the user data to the UPF 312 over the N4 interface. The UPF 312 provides the data to the data network 314 over the N6 interface. FIG. 3 also illustrates communications and interfaces between the AMF 308 and authentication entity 316, which is assumed to include AUSF 318, UDM 320 and User Data Repository (UDR) 322. The SMF 310 and UDR 322 are also in communication with PCF 324 as illustrated.

Data packet size can have significant impacts on IoT device battery life. For 5G CIoT, there is need for supporting the transfer of infrequent "small" data over the control plane. As described in further detail below, a communication system may be configured to define a "small" data size, such as based on the size of typical messages that are expected to be sent using a particular type of IoT device in 5G CIoT. User-defined thresholds may be used for specifying an appropriate size range for "small" data as the term is used herein. When transporting the small data over the control plane, it is important to minimize the overhead involved in the transport thereby reducing energy consumption by the IoT device to save battery life.

Illustrative embodiments provide efficient methods for transporting infrequent small data for IoT devices, advantageously extending battery life of the IoT devices. In some embodiments, efficient transport of the infrequent small data is provided over Non-Access Stratum (NAS) signalling. To do so, some embodiments define a dedicated container, referred to herein as a "CIoT small data container" for such small data transport. The CIoT small data container is treated as a special type of payload container type, and the UE 302 and AMF 308 are configured with procedures for handling the CIoT small data container. In some embodiments, mechanisms are provided to support the configuration of a maximum small data size, along with logic for handling both small data transport and "large" data transport. In this context, "large" data transport refers to the transport of data that exceeds user-defined thresholds for "small" data as described above and elsewhere herein. Additional user-defined thresholds may be used to specify a maximum size for "large" data transport over the control plane (with larger data being transported over the user plane).

Techniques are also provided for protection and ciphering of data contents that are transported over the control plane.

Figure 4:
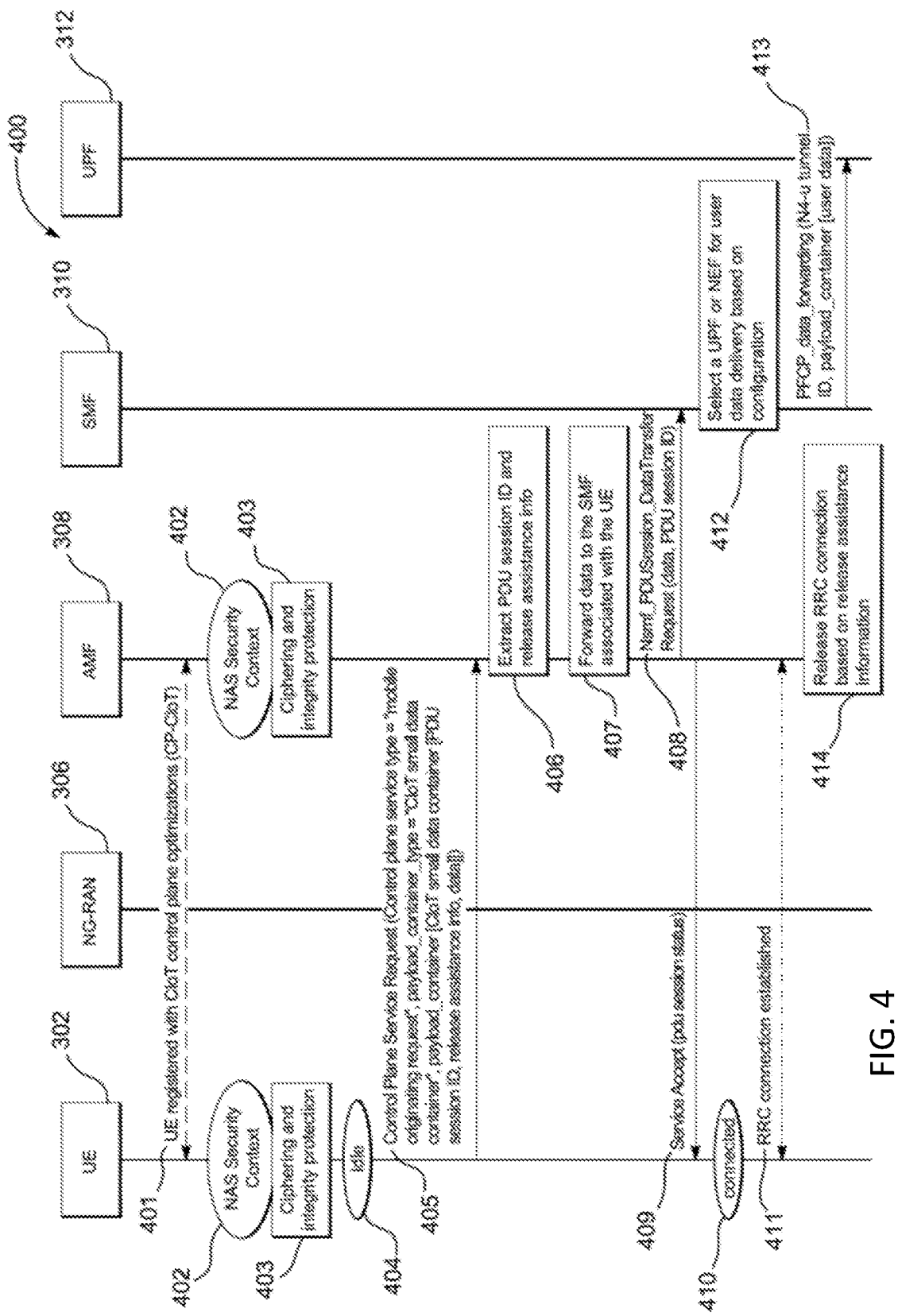
FIG. 4 illustrates uplink transfer of small data for user equipment in an idle mode, according to an illustrative embodiment.

FIG. 4 shows an uplink transfer procedure 400 of small data for UE 302 in an idle mode. The UE 302 in the idle mode over 3GPP access may have uplink user data pending, and the UE may use 5G system (5GS) services with control plane CIoT 5GS optimization. As a prerequisite, it is assumed that the UE 302 is registered 401 with the AMF 308 for CIoT control plane optimizations (CP-CIoT) that a NAS security context 402 is established, and that ciphering and integrity protection mechanisms 403 are provided. Further, it is assumed that the UE 302 is in the idle mode 404 and has uplink user data to send.

In step 405, the UE 302 sets a control plane service type of a control plane service request message to "mobile originating request." In addition, the UE 302 sets the payload container information element (IE) type to "CIoT small data container." The UE 302 formats a Protocol Data Unit (PDU) session identifier (ID) and release assistance information together with the data in the CIoT small data container. In some embodiments, the PDU session ID is 4 bits, and the release assistance information is 2 bits. The release assistance information is included when the UE 302 wishes to inform the network of one of two conditions. The first condition is that, subsequent to the current uplink data transmission, no further uplink and no further downlink data transmission (e.g., acknowledgments, responses, etc.) is expected. In other words, the first condition occurs when the upper layers indicate that data exchanges have completed with the current uplink data transfer. The second condition is that, subsequent to the current uplink data transmission, only a single downlink data transmission and no further uplink data transmission is expected. In other words, the second condition occurs when the upper layers indicate that data exchanges will have completed with the next downlink data transmission. It should be appreciated that in other embodiments, different conditions or more generally different release assistance information may be utilized. In step 405, the UE 302 also sets the payload container IE to the CIoT small data container.

The UE 302 includes the payload container type and payload container formatted as described above in a control plane service request message that is sent in step 405. If additional information, such as PDU sessions state for PDU session synchronization or CP to UP switch indication (e.g., via uplink data status), such information may be included in the step 405 control plane service request message as separate IEs. The UE 302 then sends the step 405 control plane service request message to the AMF 308 (e.g., via NG-RAN 306). The UE 302 also starts a retransmission timer (e.g., T3517) and enters the state "5GMM-SERVICE-REQUEST-INITIATED."

Upon receipt of the step 405 control plane service request message with the control plane service type indicating "mobile originating request", and after completion of the 5GS Mobility Management (5GMM) common procedures, the AMF 308 sends a service accept message 409 to the UE 302. If the payload container IE is included in the step 405 control plane service request message, and the payload container type IE is set to "CIoT small data container" and if the payload container IE successfully passes the integrity check, the AMF 308 extracts the PDU session ID and release assistance information in step 406. The AMF 308 forwards the data contents to the SMF 310 in step 407 via an Nsmf_PDUSession_DataTransfer request message in step 408. This request message includes the data and PDU session ID.

As noted above, the AMF 308 sends a service accept message 409 to the UE 302. The service accept message 409 indicates the PDU session status, and the UE 302 is now in a connected mode 410. At this point, a Radio Resource Control (RRC) connection is established 411. If the PDU session status IE is included in the step 405 control plane service request message, or if the AMF 308 needs to perform a PDU session status synchronization, the AMF 308 includes a PDU session status IE in the service accept message 409 to indicate which PDU sessions associated with the access type in the service accept message 409 are active in the AMF 308.

The SMF 310 selects a UPF 312 (or a NEF) for user data delivery from the UE 302 based on the configuration in step 412. The SMF 310 then generates and sends a PFCP_data_forwarding message 413 to the UPF 312. The PFCP_data_forwarding message 413 is a Packet Forwarding Control Protocol (PFCP) message, and includes a tunnel ID, and the payload container (e.g., user data) from the step 405 control plane service request message.

If the release assistance indication IE is included in the step 405 control plane service request message, and if the payload container type IE is set to "CIoT small data container", the AMF 308 will act in step 414 based on the condition indicated by the release assistance indication. If the release assistance indication indicates that no further uplink or downlink data transmission subsequent to the uplink data transmission is expected (e.g., the first condition described above), the AMF 308 releases the RRC connection (e.g., the NAS signaling connection). If the release assistance indication indicates that only a single downlink data transmission and no further uplink data transmission subsequent to the uplink data transmission is expected (e.g., the second condition described above), the AMF 308 releases the RRC connection upon subsequent delivery of the next received downlink data transmission to the UE 302.

Upon successful completion of the above-described procedure, the UE 302 resets a service request attempt counter, stops the timer T3517, and enters a state of "5GMM-REGISTERED." The UE 302 also treats the indication from the lower layers that the RRC connection has been released as successful completion of the procedure. If the PDU session status information element is included in the service accept message 409, then the UE 302 performs a local release of all those PDU sessions that are active on the UE side associated with the 3GPP access but are indicated by the AMF 308 as being inactive.

Figure 5:
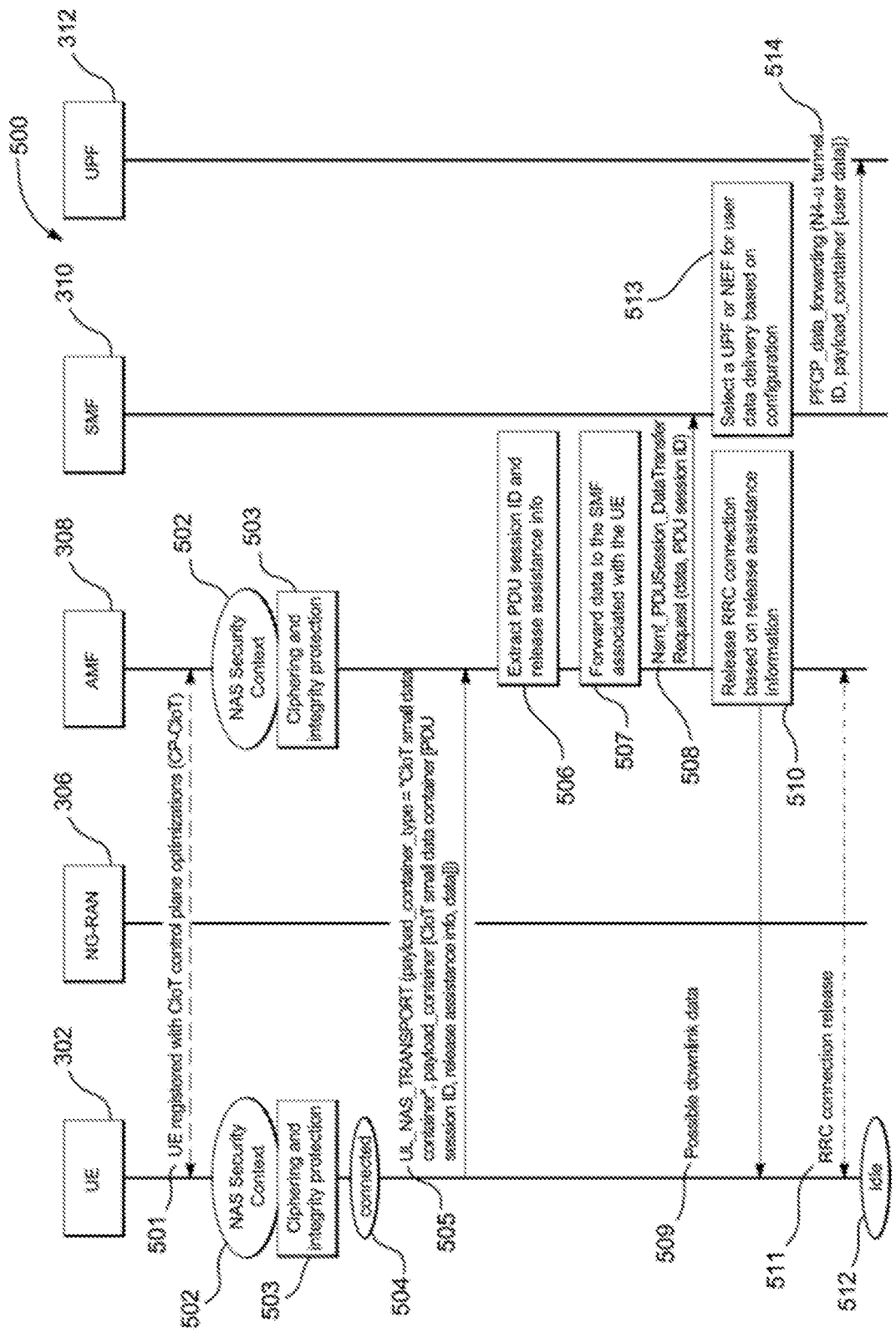
FIG. 5 illustrates uplink transfer of small data for user equipment in a connected mode, according to an illustrative embodiment.

FIG. 5 shows an uplink transfer procedure 500 of small data for UE 302 in a connected mode. The UE 302 in the idle mode over 3GPP access may have uplink user data pending, and the UE may use 5GS services with control plane CIoT 5GS optimization. Similar to FIG. 4, it is assumed that the UE 302 is registered 501 with the AMF 308 for CP-CIoT that a NAS security context 502 is established, and that ciphering and integrity protection mechanisms 503 are provided. Further, it is assumed that the UE 302 is in the connected mode 504 and has uplink user data to send.

In step 505, the UE 302 generates an uplink NAS data transport (UL_NAS_TRANSPORT) message. The UE 302 sets a payload container type IE to "CIoT small data container" and formats the PDU session ID and release assistance information together with data in the CIoT small data container. Again, the PDU session ID may be 4 bits, while the release assistance information is 2 bits. The release assistance information is similar to that described above in conjunction with FIG. 4, and is used by the UE 302 to inform the network of the first condition (e.g., that subsequent to the current uplink data transmission, no further uplink and no further downlink data transmission is expected) or the second condition (e.g., that subsequent to the current uplink data transmission, only a single downlink data transmission and no further uplink data transmission is expected). It should be appreciated that in other embodiments, different conditions or more generally different release assistance information may be utilized. The UE 302 also sets the payload container IT to the CIoT small data container.

The UE 302 includes the payload container type and payload container, formatted as described above, in an uplink NAS data transport message in step 505. If additional information such as PDU sessions status for PDU session synchronization or CP to UP switch indication (e.g., via uplink data status) is needed, such information may be included in the step 505 uplink NAS data transport message as separate IEs. The UE 302 then sends the step 505 uplink NAS data transport message to the AMF 308.

Upon receipt of the step 505 uplink NAS data transport message, if the payload container IE is included and the payload container type IE is set to "CIoT small data container", and if the payload container IE successfully passes an integrity check, the AMF 308 extracts the PDU session ID and release assistance information in step 506. The AMF 308 forwards the data to the SMF 310 associated with the UE in step 507, such as via Nsmf_PDUSession_DataTransfer request message 508 similar to the message 408 described above in conjunction with FIG. 4.

Possible downlink data is provided to the UE 302 in step 509, if applicable. The AMF 308 handles the NAS signaling connection release (e.g., RRC release) in step 510 based on the release assistance information that is included in the step 505 uplink NAS data transport message. If the release assistance indication indicates that no further uplink or downlink data transmission subsequent to the uplink data transmission is expected (e.g., the first condition described above), the AMF 308 releases the RRC connection (e.g., the NAS signaling connection). If the release assistance indication indicates that only a single downlink data transmission and no further uplink data transmission subsequent to the uplink data transmission is expected (e.g., the second condition described above), the AMF 308 releases the RRC connection upon subsequent delivery of the next received downlink data transmission to the UE 302. The RRC connection is released in step 511, and the UE 302 enters the idle mode in step 512.

The SMF 310 selects a UPF 312 (or a NEF) for user data delivery from the UE 302 based on the configuration in step 513. The SMF 310 then generates and sends a PFCP_data_forwarding message 514 to the UPF 312. The PFCP_data_forwarding message 514 is similar to that described above with respect to the PFCP_data_forwarding message 413.

Figure 6:
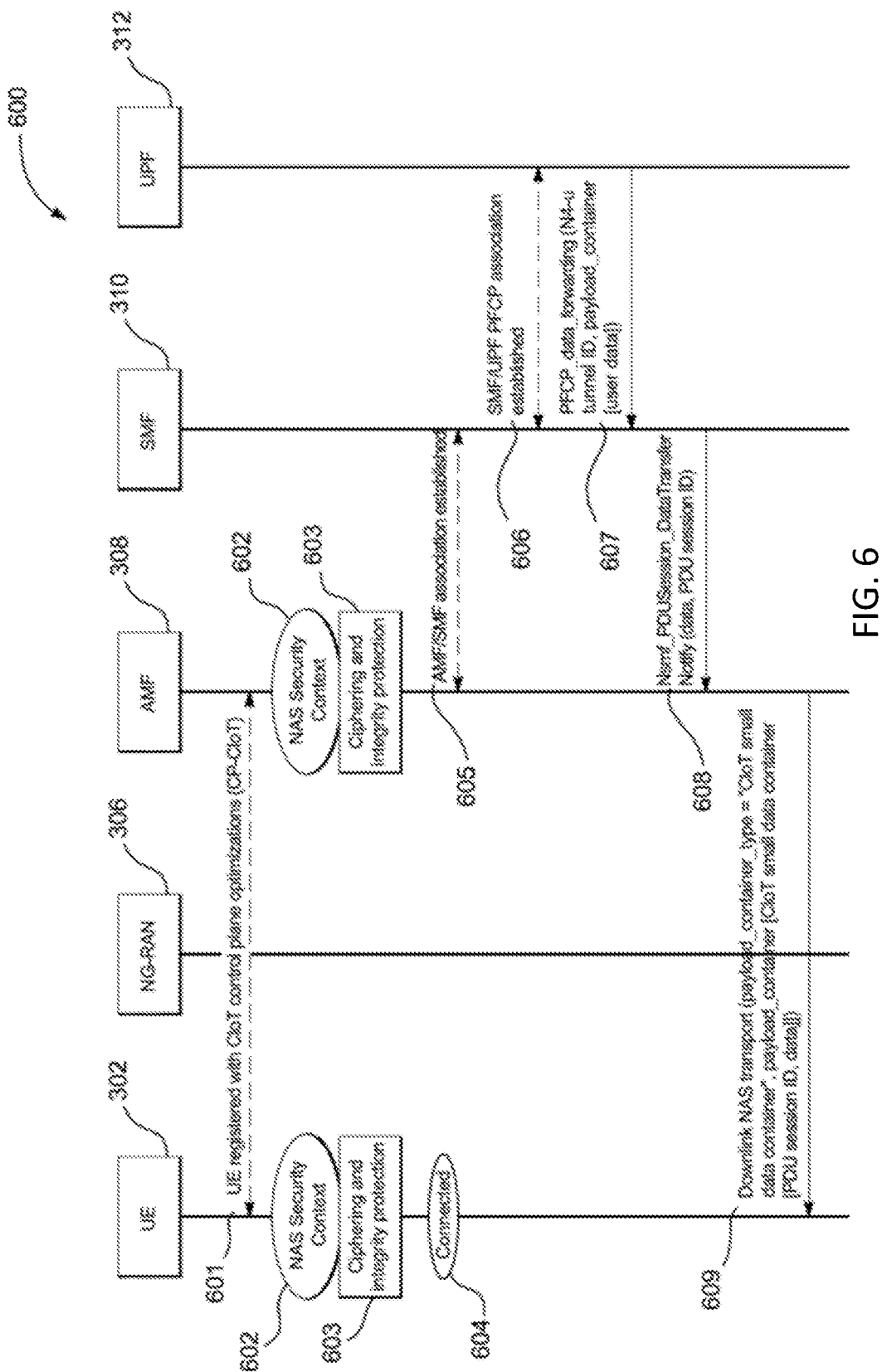
FIG. 6 illustrates downlink transfer of small data for user equipment, according to an illustrative embodiment.

FIGS. 4 and 5 show mobile-originated NAS transport procedures 400 and 500 for the UE 302 in the idle and connected modes, respectively. FIG. 6 shows a downlink transfer procedure 600 of small data for UE 302 that is network-initiated, providing CIoT user data over the control plane from the AMF 308 to the UE 302 in a 5GMM message (e.g., over the N6 interface in a 5G system). Similar to FIGS. 4 and 5, it is assumed that the UE 302 is registered 601 with the AMF 308 for CP-CIoT, that a NAS security context 602 is established, and that ciphering and integrity protection mechanisms 603 are provided. Further, it is assumed that the UE 302 is in the connected mode 604 and that AMF 308 has downlink user data to be sent to the UE 302.

The AMF 308 and SMF 310 have an association established with one another in step 605, and the SMF 310 and UPF 312 have a PFCP association established with one another in step 606. The UPF 312 provides a PFCP_data_forwarding message to the SMF 310 in step 607. This message includes a tunnel ID and a payload container with user data to be sent to the UE 302. The SMF 310 generates and sends a Nsmf_PDUSession_DataTransfer Notify message in step 608, including the data and the PDU session ID.

In step 609, the AMF 308 generates and sends a downlink NAS transport message to the UE 302. The AMF 308 sets the payload container type IE to "CIoT small data container" and formats the PDU session ID together with the downlink data for the UE 302 in the CIoT small data container. Again, the PDU session ID may be formatted as 4 bits. The AMF 308 includes the payload container type and the payload container formatted as described above into a downlink NAS data transport message. If additional information, such as PDU session status for PDU session synchronization or CP to UP switch indication (e.g., via uplink data status) are needed, such information may be included in the downlink NAS data transport message as separate IEs.

Upon receipt of the downlink NAS data transport message in step 609, if the payload container IE is included, if the payload container type IE is set to "CIoT small data container", and if the payload container IE successfully passes an integrity check, the UE 302 extracts the PDU session ID and data contents from the payload container IE and forwards the data content to the upper layer application.

Figure 7:
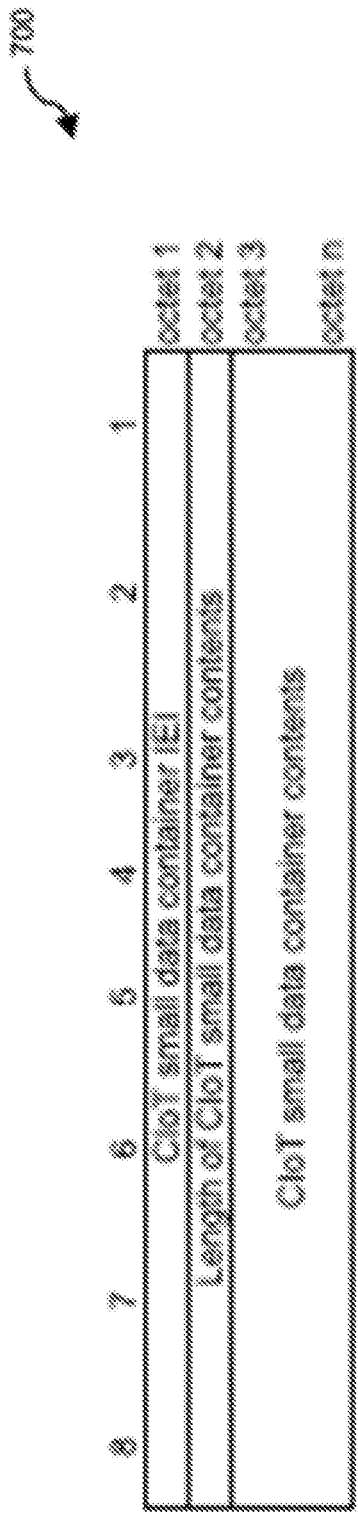
FIG. 7 illustrates a structure of a small data container information element, according to an illustrative embodiment.

FIG. 7 shows a structure 700 of a CIoT small data container IE. The CIoT small data container IE is used to encapsulate user data transferred between the UE 302 and AMF 308. The CIoT small data container IE is coded as illustrated in FIG. 7. The CIoT small data container, in some embodiments, is a type 4 information element with a minimum length of 3 octets and a maximum length of 257 octets. Octet 1 includes the CIoT small data container IE identifier (IEI), and octet 2 includes the length of the CIoT small data container contents. Octets 3 through n include the CIoT small data container contents. The value of n is 257, corresponding to a maximum length of the CIoT small data container contents of 255 (e.g., 257 minus octet 1 used for the CIoT small data container IEI and octet 2 used to indicate the length of the CIoT small data container contents). As described in further detail below with respect to FIG. 8, octet 3 is also reserved in some embodiments, thus the user data to be transmitted may occupy up to 254 octets.

Figure 8:
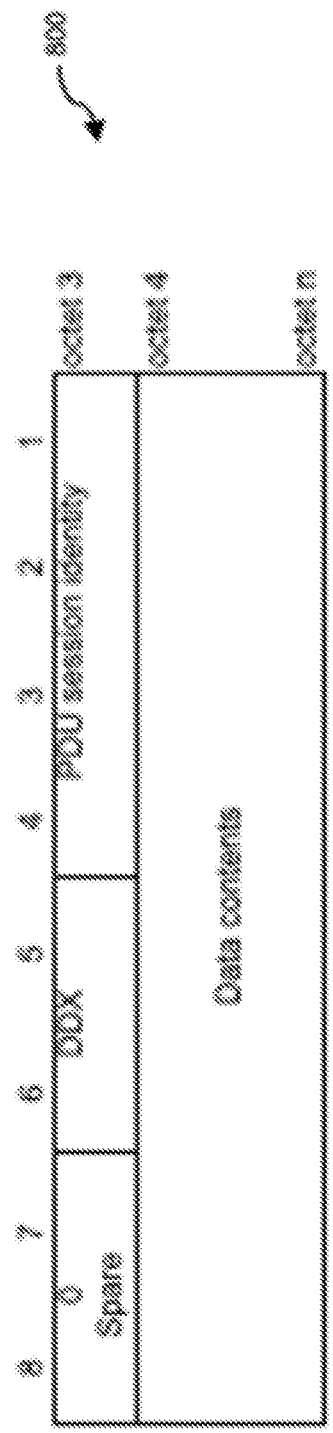
FIG. 8 illustrates the small data container contents, according to an illustrative embodiment.

FIG. 8 shows the CIoT small data container contents (e.g., octets 3 through n in the structure 700). Octet 3 includes PDU session identity information coded with 4 bits and downlink data expected (DDX) coded in 2 bits. Octet 3 also includes two spare bits. Octets 4 through n include the data contents. FIG. 9 shows contents 900 of the CIoT small data container IE, more particularly illustrating examples of the information in octets 3 through n. For example, FIG. 9 illustrates how the PDU session data is coded with 4 bits and how the DDX data is coded with 2 bits.

The CIoT small data container is assumed to be "small" in size or limited to data contents of 255 octets as noted in FIG. 9. A CIoT user data container may be used to encapsulate "large" user data that is transferred between the UE 302 and AMF 308 up to 65,531 octets. The CIoT user data container IE is coded as illustrated in FIGS. 10-12.

Figure 10:
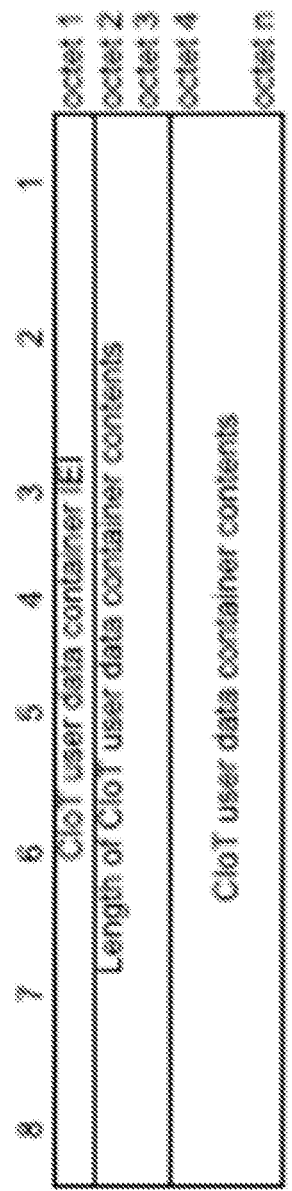
FIG. 10 illustrates a structure of a user data container information element, according to an illustrative embodiment.

FIG. 10 shows a structure 1000 of a CIoT user data container IE. The CIoT user data container, in some embodiments, is a type 6 information element with a minimum length of 5 octets and a maximum length of 65,535 octets. Octet 1 includes the CIoT user data container IEI, and octets 2 and 3 include the length of the CIoT user data container contents. Octets 4 through n include the CIoT user data container contents. 65,531 octets are available for the user data to be transmitted, as there are three overhead octets (e.g., octet 1 including the CIoT user data container IEI and octets 2 and 3 including the length of the CIoT user data container contents) plus, as described in further detail below, octet 4 is reserved in some embodiments.

Figure 11:
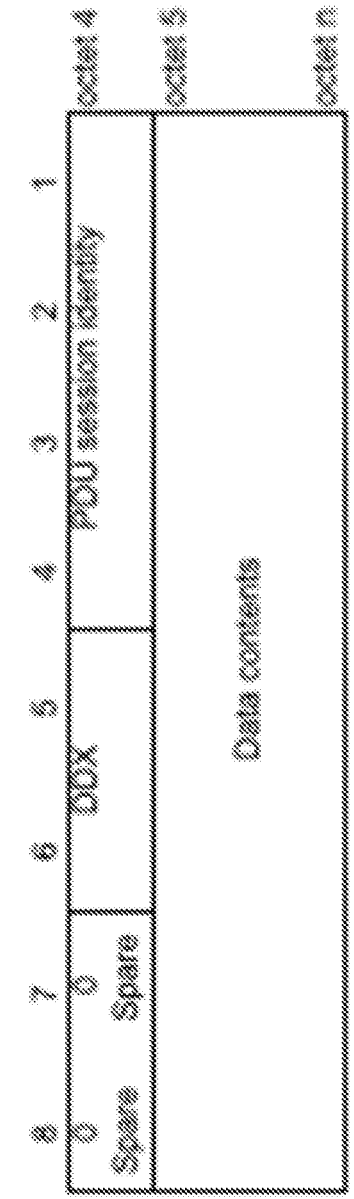
FIG. 11 illustrates the user data container contents, according to an illustrative embodiment.

FIG. 11 shows the CIoT user data container contents (e.g., octets 4 through n in the structure 1000). Octet 4 includes PDU session identity information coded with 4 bits and DDX coded in 2 bits. Octet 4 also includes two spare bits. Octets 5 through n include the data contents. FIG. 12 shows contents 1200 of the CIoT user data container IE, more particularly illustrating examples of the information in octets 4 through n. For example, FIG. 12 illustrates how the PDU session data is coded with 4 bits and how the DDX data is coded with 2 bits.

When in idle or connected mode, the UE 302 decides whether to send data via a CIoT user data container or a CIoT small data container based on the data size to be transported, a configured maximum small data size (e.g., a CP-CIoT_MaxSmallDataSize parameter that is configured as a NAS Management Object (MO) or in a Universal Subscriber Identity Module (USIM) Elementary File (EF)), and a configured maximum data size (e.g., a CP-CIoT_MaxDataSize configured as a NAS MO or in a USIM EF). When in connected mode, the AMF 308 decides whether to send the data to the UE 302 via the CIoT user data container or the CIoT small data container based on the data size to be transported, the configured maximum small data size and the configured maximum data size.

More specifically, from the UE 302 side, the decision of whether to use the CIoT user data container or the CIoT small data container may use the following algorithm. If the user data size is smaller than the configured maximum small data size (e.g., less than CP-CIoT_MaxSmallDataSize), the UE 302 sends the data using the CIoT small data container. If the user data size is larger than the configured maximum small data size (e.g., greater than CP-CIoT_MaxSmallDataSize) and less than 254 octets, the UE 302 sends the data using the CIoT small data container. If the user data size is larger than 254 octets but less than the configured maximum data size (e.g., less than CP-CIoT_MaxDataSize), the UE 302 sends the data using the CIoT user data container. If the user data size is larger than the configured maximum data size (e.g., larger than CP-CIoT_MaxDataSize), the UE 302 switches from CP-CIoT optimizations to UP-CIoT optimizations, and sends data using the user plane rather than from the control plane via NAS signaling.

From the network side (e.g., from the AMF 308), the decision of whether to use the CIoT user data container or the CIoT small data container may use the following algorithm. If the user data size is smaller than the configured maximum small data size (e.g., less than CP-CIoT_MaxSmallDataSize), the AMF 308 sends the data using the CIoT small data container. If the user data size is larger than the configured maximum small data size (e.g., greater than CP-CIoT_MaxSmallDataSize) and less than 254 octets, the AMF 308 sends the data using the CIoT small data container. If the user data size is larger than 254 octets but less than the configured maximum data size (e.g., less than CP-CIoT_MaxDataSize), the AMF 308 sends the data using the CIoT user data container. If the user data size is larger than the configured maximum data size (e.g., larger than CP-CIoT_MaxDataSize), the AMF 308 switches from CP-CIoT optimizations to UP-CIoT optimizations and sends the data using the user plane rather than using the control plane via NAS signaling.

Figure 13:
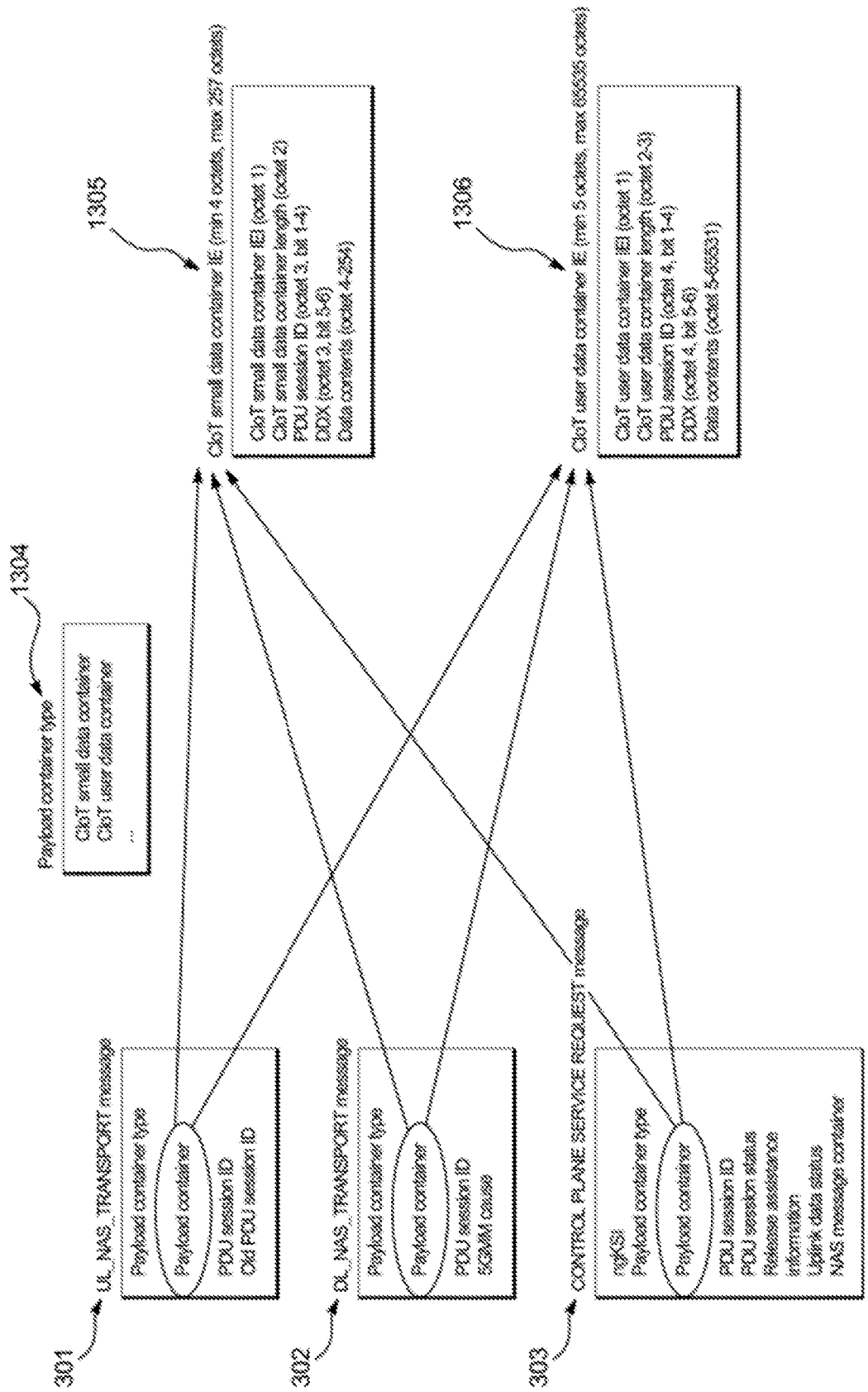
FIG. 13 illustrates message and information element usage for small data containers, according to an illustrative embodiment.

FIG. 13 shows message and IE usage for CIoT small data containers and CIoT user data containers. Tables 1301, 1302 and 1303 illustrate message content for uplink NAS transport messages (e.g., as used in step 505 in FIG. 5), downlink NAS transport messages (e.g., as used in step 609 in FIG. 6) and control plane service request messages (e.g., as used in step 405 in FIG. 4), respectively. The payload container of each of the tables 1301, 1302 and 1303 is one of the payload container types illustrated in table 1304 (e.g., one of the CIoT small data container and the CIoT user data container). Tables 1305 and 1306 illustrate the structures of these payload container types. More particular, table 1305 illustrates the structure of the CIoT small data container and table 1306 illustrates the structure of the CIoT user data container.

Figures 14, 15:
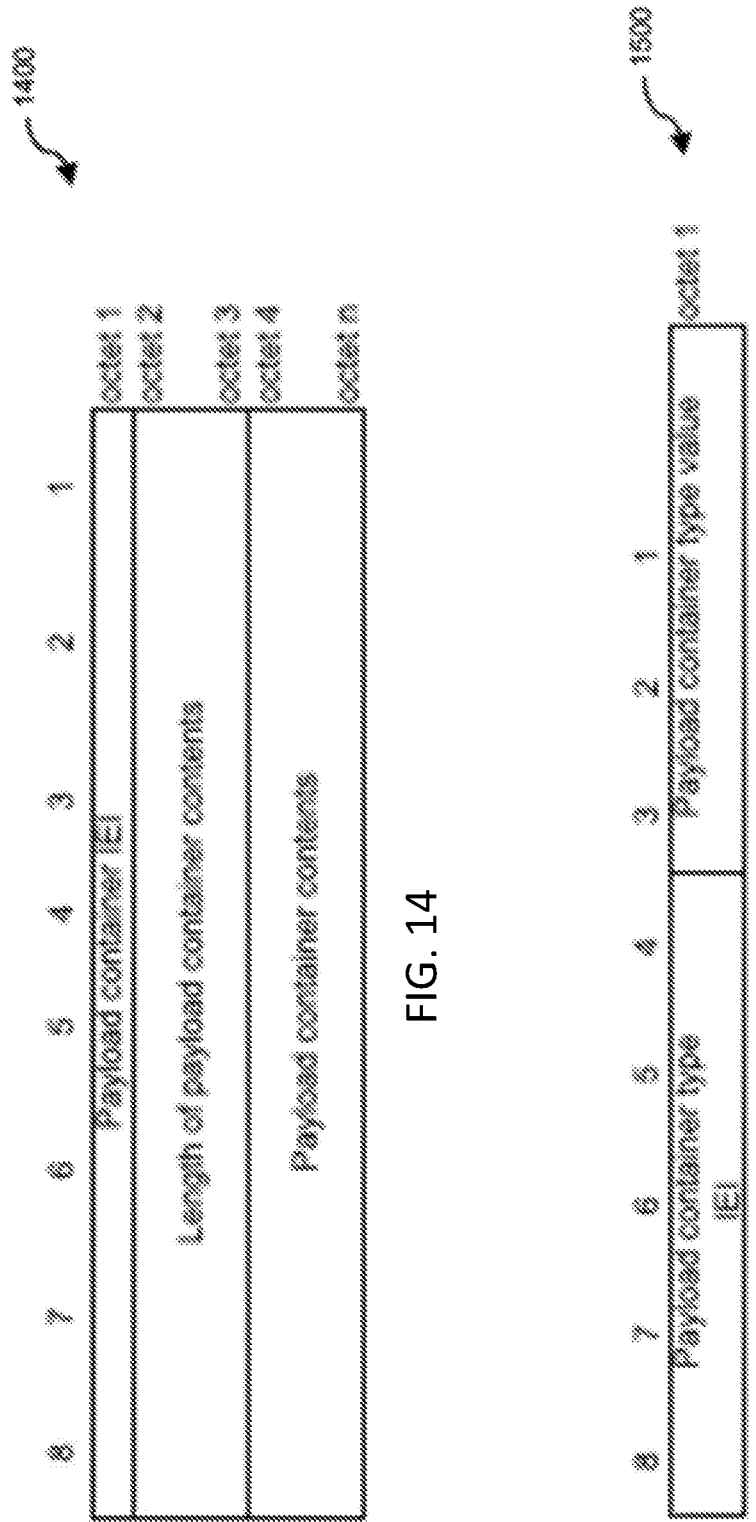
FIG. 14 illustrates a structure of a payload container information element, according to an illustrative embodiment.
FIG. 15 illustrates a structure of a payload container type information element, according to an illustrative embodiment.

The payload container IE is used to transport one or more payloads. If multiple payloads are transported, the associated information of each payload is also transported together with the payload. The payload container IE is coded as shown in FIG. 14. The payload container IE 1400 of FIG. 14, in some embodiments, is a type 6 information element with a minimum length of 4 octets and a maximum length of 65,538 octets. The payload container contents (octet 4 to octet n) have a maximum value of 65,535 octets.

If the payload container type is set to "CIoT small data container" and is included in the control plane service request message (e.g., as used in step 405 in FIG. 4), the payload container contents are coded the same way as the contents of the CIoT small data container IE except that the first two octets are not included.

If the payload container type is set to "CIoT small data container" and is included in an uplink NS transport message (e.g., as used in step 505 of FIG. 5), the payload container contents are coded the same way as the contents of the CIoT small data container IE except that the first two octets are not included.

If the payload container type is set to "CIoT small data container" and is included in the downlink NS transport message (e.g., as used in step 609 in FIG. 6), the payload container contents are coded the same way as the contents of the CIoT small data container IE except that the first two octets are not included.

If the payload container type is set to "CIoT user data container" and is included in the uplink NAS transport message (e.g., as used in step 505 in FIG. 5), the payload container contents are coded the same way as the contents of the CIoT user data container IE except that the first three octets are not included.

If the payload container type is set to "CIoT user data container" and is included in the downlink NAS transport message (e.g., as used in step 609 in FIG. 6), the payload container contents are coded the same way as the contents of the CIoT user data container IE except that the first three octets are not included.

If the payload container type is set to "CIoT user data container" and is included in the control plane service request message (e.g., as used in step 405 in FIG. 4), the payload container contents are coded the same way as the contents of the CIoT user data container IE except that the first three octets are not included.

Figure 16:
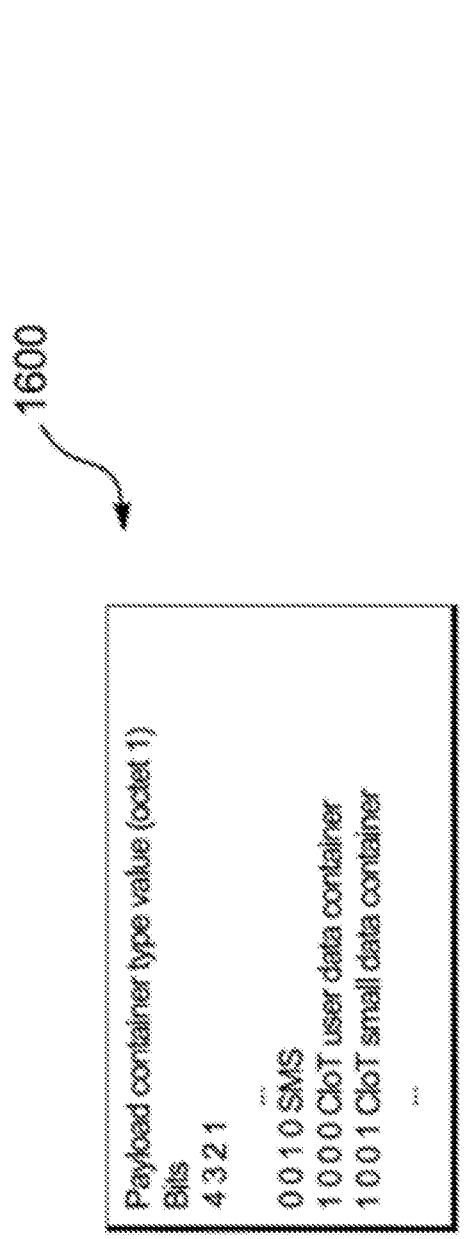
FIG. 16 illustrates contents of a payload container information element, according to an illustrative embodiment.

In some embodiments, new payload container types are defined for "CIoT small data container" and "CIoT user data container." The purpose of the payload container type IE is to indicate that type of payload included in the payload container IE. FIG. 15 shows a structure 1500 of a payload container type IE, with bits 1-4 in octet 1 used to provide the payload container type value and bites 5-8 in octet 1 used to provide the payload container type IE. FIG. 16 shows coding 1600 of the payload container type value in bits 1-4 of octet 1 of the payload container type IE 1500. As illustrate, a short message service (SMS) message may be coded in bits 4 3 2 1 and 0 0 1 0, the CIoT user data container may be coded in bits 4 3 2 1 and 1 0 0 0, and the CIoT small data container may be coded in bits 4 3 2 1 as 1 0 0 1.

Figure 17:
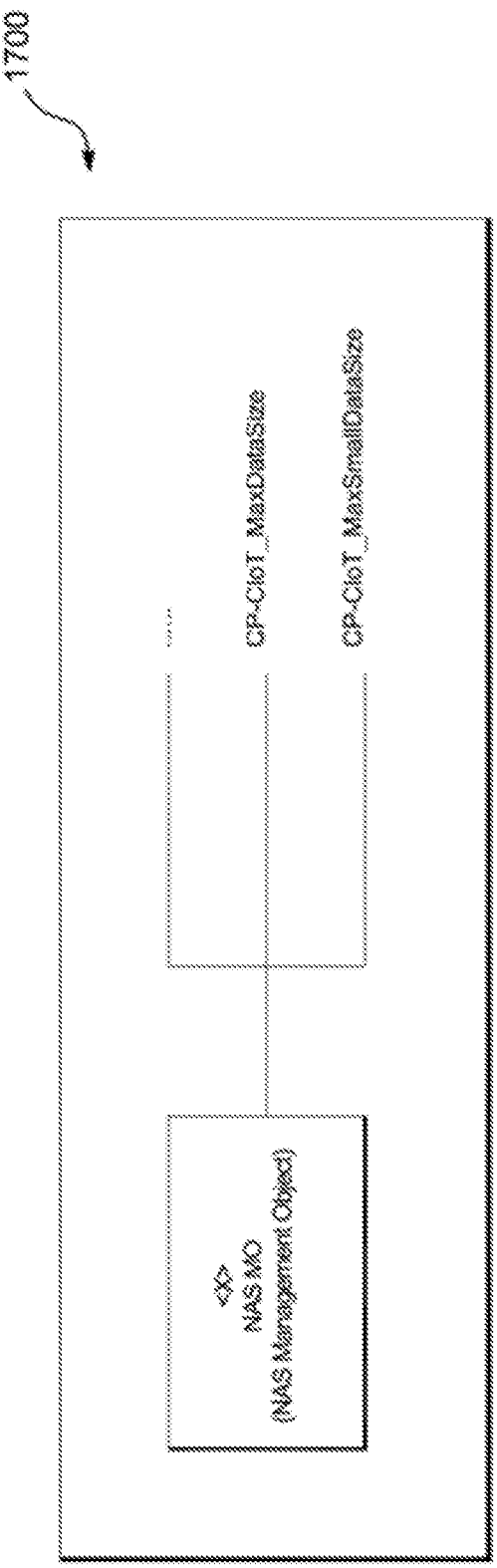
FIG. 17 illustrates a control plane data size configuration, according to an illustrative embodiment.

FIG. 17 shows a control plane data size configuration 1700. More particularly, the control plane data size configuration 1700 is provide in a NAS MO, with a maximum data size parameter (e.g., CP-CIoT_MaxDataSize) and a maximum small data size parameter (e.g., CP-CIoT_MaxSmallDataSize).

The CP-CIoTMaxDataSize leaf of the NAS MO indicates a configured maximum user data size that can be transported over the control plane via NAS signaling when in a Home Public Land Mobile Network (HPLMN) or Equivalent HPLMN (EHPLMN), as described in 3GPP TS 23.122. The occurrence of this leaf is zero or one, with a format of int (integer), access types of "Get" and "Replace" and a value in the range of 0 to 65, 531. If not provisioned, a default value of 65,531 octets is used for this leaf.

The CP-CIoT_MaxSmallDataSize leaf of the NAS MO indicates a configured maximum small data size that can be transported over the control plane via NAS signaling when in the HPLMN or EHPLMN. The occurrence of this leaf is zero or one, with a format of int, access types of "Get" and "Replace" and a value in the range of 0 to 254. If not provisioned, a default value of 254 is used for this leaf.

The configuration parameters (e.g., in the NAS MO shown in FIG. 17) may be set by a device's Home Network Operator (HNO), based on device category and pattern (e.g., including typical data size and sending frequency), and device physical layer transport block size. eMTC Cat-M1 type devices have a downlink (DL) Transport Block Size (TBS) of 1000 bits (e.g., 125 octets) and an uplink (UL) TBS of 1000 bits (in 3GPP Release 13) and 2984 in 3GPP Release 14. eMTC Cat-M2 type devices have a DL TBS of 4008 bits and an UL TBS of 2984 for 1.4 Megahertz (MHz) and 6968 for 5 MHz. NB-IoT Cat-NB1 type devices have a DL TBS of 860 bits (e.g., about 110 octets) and an UL TBS of 1000 bits (e.g., about 125 octets). NB-IoT Cat-NB2 type devices have a DL TBS of 2536 bits and UL TBS of 2536 bits. The CIoT small data container is thus sufficient for NB-IoT Cat-NB1 type devices, and is also suitable for eMTC Cat-M1 type devices. For other types of devices, the CIoT user data container may be desired as it can support transport of data up to 65,531 octets.

The protection of small data sent in the step 405 control plane service request message when the UE 302 is in idle mode (e.g., as in FIG. 4) may be achieved as described below. When the UE 302 is in a connected mode (e.g., as in FIGS. 5 and 6), a secure NAS connection is already established and no additional protection of small data is needed.

To reduce overall message overhead, instead of ciphering the entire message only the non-cleartext IEs are ciphered in some embodiments. After the UE 302 formats the payload container, the UE 302 includes the payload container type IE, payload container IE and other non-cleartext IEs in the NAS message container IE and ciphers the value part of the NAS message container IE using the ciphering key from the NAS security context of the UE 302. This is illustrated in the example control plane service request message content 1800 shown in FIG. 18. The UE 302 sets the security header type of the step 405 control plane service request message to "integrity protected" and sends the control plane service request message containing the cleartext IEs and the NAS message container IE to the network (e.g., to AMF 308).

When the AMF 308 receives an integrity protected control plane service request message that includes a NAS message container IE, the AMF 308 performs the integrity check at the network side. Once the integrity check is successful, the AMF 308 deciphers the value part of the NAS message container IE and extracts the payload container type IE, payload container IE and other non-cleartext IEs.

If a control plane service request message fails the integrity check at the network side and the UE 302 has only non-emergency PDU sessions established, the AMF 308 sends a service reject message with 5GMM cause #9 ("UE identity cannot be derived by the network") and keeps the 5GMM-content and 5G NAS security context unchanged.

As illustrated in FIG. 18, the cleartext IEs of the control plane service request message include: extended protocol discriminator; security header type; spare half octet; ngKSI (ng Key Set Identifier); control plane service request message identity; and control plane service type. The rest of the IEs shown in FIG. 18 are non-cleartext IEs, including: payload container type; payload container IE; PDU session ID; PDU session status; uplink status; release assistance information IE; etc.

If the data to be transported exceeds the CIoT_MaxSmallDataSize parameter, the larger CIoT user data container is used to buffer user data. The handling logic of transporting large IoT data for the UE 302 in both the idle mode and the connected mode is the same as described above, except that the payload container type IE is set to "CIoT user data container" and the payload container IE is set to the value part of the CIoT user data container. The logic for ciphering large IoT data for the UE 302 in the idle mode (e.g., as in FIG. 4) may be the same as that described above for small IoT data.

Figure 19:
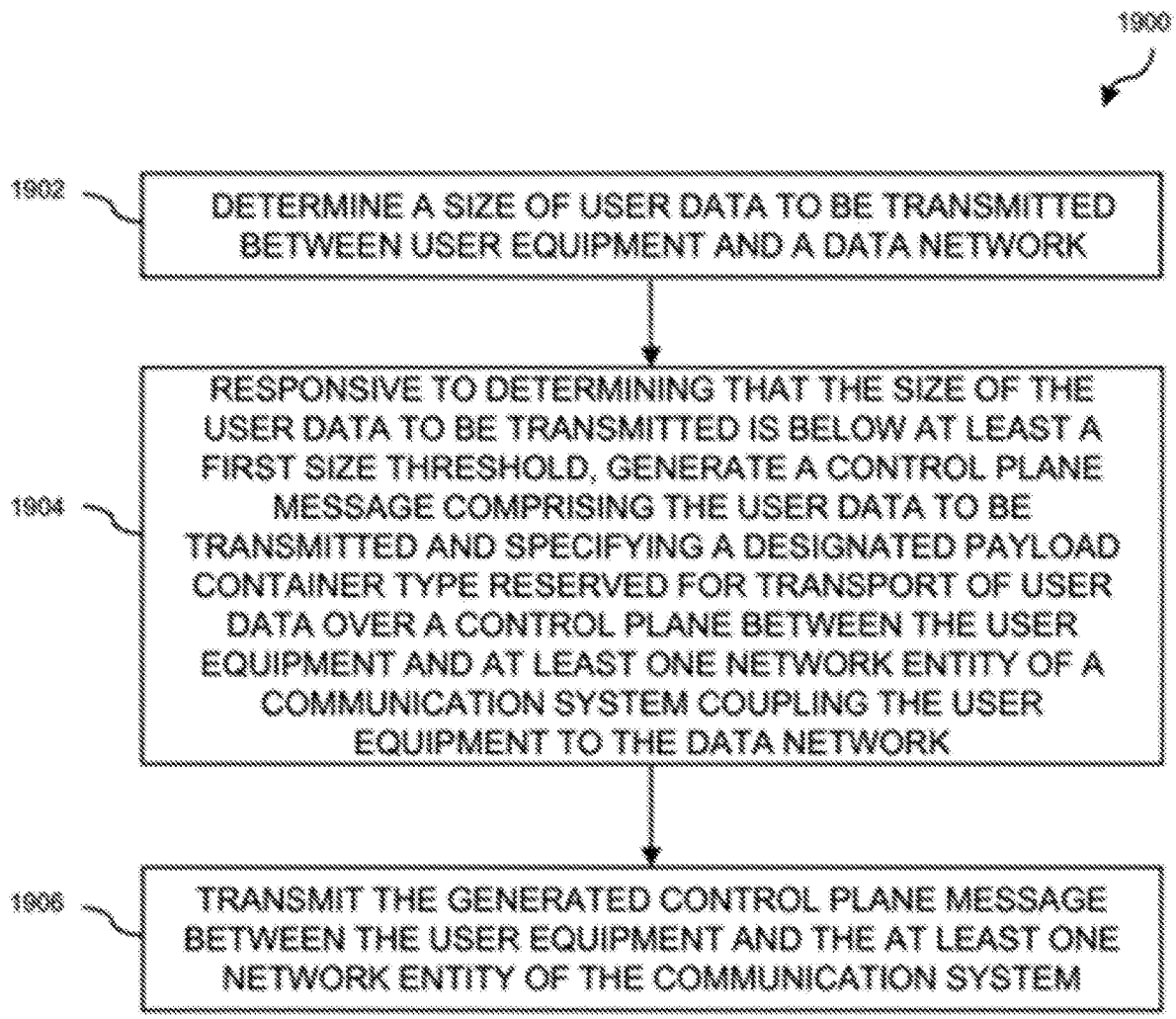
FIG. 19 illustrates a control plane-based user data transport methodology using designated payload container types, according to an illustrative embodiment.

FIG. 19 illustrates a control plane-based user data transport methodology 1900, according to an illustrative embodiment. As shown, in step 1902, the method comprises determining a size of user data to be transmitted between user equipment (e.g., UE 302) and a data network (e.g., data network 314). Responsive to determining that the size of the user data to be transmitted is below at least a threshold for small data transport, a control plane message is generated in step 1904. The generated control plane message comprises the user data to be transmitted and specifies a designated payload container type reserved for transport of user data over a control plane between the user equipment and at least one network entity (e.g., AMF 308) of a communication system coupling the user equipment to the data network. In step 1906, the generated control plane message is transmitted between the user equipment and the at least one network entity of the communication system.

The methodology 1900 may be performed by the user equipment, which may be part of an IoT device.

If the user equipment is in an idle mode, the generated control plane message may comprise a control plane service request message with a control plane service type set to indicate a user equipment-originating request, and step 1906 may comprise transmitting the generated control plane message from the user equipment to the at least one network entity of the communication system. The methodology 1900 may further comprise applying transport protection to the generated control plane message, the transport protection comprising providing one or more IEs including the user data content of the designated payload container type in a separate NAS message container, and applying ciphering to the separate NAS message container utilizing a NAS security context of the user equipment. The one or more IEs provided in the separate NAS message container may comprise at least one of a payload container type IE, a payload container IE, a PDU session identifier IE, a PDU session status IE, an uplink status IE, and a release assistance indication IE.

If the user equipment is in a connected mode, the generated control plane message may comprise an uplink NAS data transport message, step 1906 may comprise transmitting the generated control plane message from the user equipment to the at least one network entity of the communication system. Alternatively where the user equipment is in the connected mode, the generated control plane message comprises a downlink NAS data transport message, and step 1906 comprises transmitting the generated control plane message from the at least one network entity of the communication system to the user equipment.

Step 1904 may comprise generating a payload container type information element comprising a payload container information element identifier associated with the designated payload container type, an indication of a length of the user data to be transmitted, a PDU session identifier, a release assistance indication specifying when the at least one network entity of the communication system should release a NAS signaling connection (e.g., a RRC connection) for transmission of the user data between the at least one network entity and the user equipment, and the user data to be transmitted. The release assistance indication may comprise one of: an indication that the NAS signaling connection should be released subsequent to uplink transmission of the user data in the generated control plane message; and an indication that the NAS signaling connection should be released subsequent to uplink transmission of the user data in the generated control plane message and subsequent to a next downlink transmission to the user equipment.

Step 1904 may comprise generating a payload container information element of a first format responsive to determining that the size of the user data to be transmitted is below a threshold for large data transport and above the threshold for small data transport, and generating a payload container information element of a second format responsive to determining that the size of the user data to be transmitted is below the threshold for large data transport and below the threshold for small data transport. The threshold for large data transport and the threshold for small data transport may be defined in a NAS MO. The payload container information element of the first format comprises a first octet comprising a payload container information element identifier associated with the designated payload container type, second and third octets comprising an indication of a length of the user data to be transmitted, a fourth octet comprising a PDU session identifier and a release assistance indication, and a plurality of additional octets comprising the user data to be transmitted. The payload container information element of the second format comprises a first octet comprising a payload container information element identifier associated with the designated payload container type, a second octet comprising an indication of a length of the user data to be transmitted, a third octet comprising a PDU session identifier and a release assistance indication, and one or more additional octets comprising the user data to be transmitted.

Responsive to determining that the size of the user data is at or above the threshold for large data transport, the payload data may be transmitted over a user plane between the user equipment and the at least one network entity of the communication system.

The communication system comprises a 5G communication system and the data network comprises a PDN. The at least one network entity of the communication system may comprise an AMF of the 5G communication system. The methodology 1900 may be performed by the AMF. If the user data to be transmitted originates at the user equipment, the AMF may initiate a data transfer request to a SMF of the 5G communication system for forwarding to at least one of a UPF and an NEF of the 5G communication system. The data transfer request forwarded to the UPF or the NEF may comprise a PFCP message.

The particular processing operations and other system functionality described in conjunction with diagrams of FIGS. 1-19 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, authentication and key agreement protocols, key pair provisioning and usage processes, messaging protocols and message formats than those described above in the context of the illustrative embodiments. These and numerous other alternative embodiments within the scope of the appended claims will be readily apparent to those skilled in the art.

EXAMPLES

The following examples relate to further embodiments:

Example 1 relates to an apparatus comprising: at least one processor; at least one memory including computer program code; the at least one memory and the computer program code being configured to, with the at least one processor, cause the apparatus at least to: determine a size of user data to be transmitted from user equipment to a data network; responsive to determining that the size of the user data to be transmitted is below at least a first size threshold, generate a control plane message comprising the user data to be transmitted and specifying a designated payload container type reserved for transport of user data over a control plane from the user equipment to at least one network entity of a communication system coupling the user equipment to the data network; and transmit the generated control plane message from the user equipment to the at least one network entity of the communication system.

Example 2 relates to an apparatus of example 1, wherein the apparatus is part of the user equipment.

Example 3 relates to an apparatus of example 2, wherein the user equipment is part of an Internet of Things (IoT) device.

Example 4 relates to an apparatus of example 2, wherein the user equipment is in an idle mode and the generated control plane message comprises a control plane service request message with a control plane service type set to indicate a user equipment-originating request.

Example 5 relates to an apparatus of example 4, further comprising applying transport protection to the generated control plane message, the transport protection comprising providing one or more information elements including the user data content of the designated payload container type in a separate Non-Access Stratum (NAS) message container, and applying ciphering to the separate NAS message container utilizing a NAS security context of the user equipment.

Example 6 relates to an apparatus of example 5, wherein the one or more information elements provided in the separate NAS message container comprise at least one of a payload container type information element, a payload container information element, a Protocol Data Unit (PDU) session identifier information element, a PDU session status information element, an uplink status information element, and a release assistance indication information element.

Example 7 relates to an apparatus of example 2, wherein the user equipment is in a connected mode and the generated control plane message comprises an uplink Non-Access Stratum (NAS) data transport message.

Example 8 relates to an apparatus of example 1, wherein generating the control plane message comprises generating a payload container type information element comprising: a payload container information element identifier associated with the designated payload container type; an indication of a length of the user data to be transmitted; a Protocol Data Unit (PDU) session identifier; a release assistance indication specifying when the at least one network entity of the communication system should release a Non-Access Stratum (NAS) signaling connection for transmission of the user data between the at least one network entity and the user equipment; and the user data to be transmitted.

Example 9 relates to an apparatus of example 8, wherein the release assistance indication comprises one of: an indication that the NAS signaling connection should be released subsequent to uplink transmission of the user data in the generated control plane message; and an indication that the NAS signaling connection should be released subsequent to uplink transmission of the user data in the generated control plane message and subsequent to a next downlink transmission to the user equipment.

Example 10 relates to an apparatus of example 1, wherein generating the control plane message comprises: generating a payload container information element of a first format responsive to determining that the size of the user data to be transmitted is below the first size threshold and above a second size threshold; and generating a payload container information element of a second format responsive to determining that the size of the user data to be transmitted is below the first size threshold and above a second size threshold.

Example 11 relates to an apparatus of example 10, wherein the first size threshold and the second size threshold are defined in a Non-Access Stratum (NAS) management object (MO).

Example 12 relates to an apparatus of example 10, wherein the payload container information element of the first format comprises: a first octet comprising a payload container information element identifier associated with the designated payload container type; second and third octets comprising an indication of a length of the user data to be transmitted; a fourth octet comprising a Protocol Data Unit (PDU) session identifier and a release assistance indication; and a plurality of additional octets comprising the user data to be transmitted.

Example 13 relates to an apparatus of example 10, wherein the payload container information element of the second format comprises: a first octet comprising a payload container information element identifier associated with the designated payload container type; a second octet comprising an indication of a length of the user data to be transmitted; a third octet comprising a Protocol Data Unit (PDU) session identifier and a release assistance indication; and one or more additional octets comprising the user data to be transmitted.

Example 14 relates to an apparatus of example 1, wherein the at least one memory and the computer program code are further configured to, with the at least one processor, cause the apparatus to, responsive to determining that the size of the user data is at or above the first size threshold, transmit the payload data over a user plane between the user equipment and the at least one network entity of the communication system.

Example 15 relates to an apparatus of example 1, wherein the communication system comprises a 5G communication system and the data network comprises a Packet Data Network (PDN).

Example 16 relates to an apparatus of example 15, wherein the at least one network entity of the communication system comprises an Access and Mobility Management Function (AMF) of the 5G communication system.

Example 17 relates to a method comprising: determining a size of user data to be transmitted from user equipment to a data network; responsive to determining that the size of the user data to be transmitted is below at least a first size threshold, generating a control plane message comprising the user data to be transmitted and specifying a designated payload container type reserved for transport of user data over a control plane from the user equipment to at least one network entity of a communication system coupling the user equipment to the data network; and transmitting the generated control plane message from the user equipment to the at least one network entity of the communication system.

Example 18 relates to an article of manufacture comprising a non-transitory computer-readable storage medium having embodied therein executable program code that when executed by a processor operatively coupled to the computer-readable storage medium cause the processor to perform steps of: determining a size of user data to be transmitted from user equipment to a data network; responsive to determining that the size of the user data to be transmitted is below at least a first size threshold, generating a control plane message comprising the user data to be transmitted and specifying a designated payload container type reserved for transport of user data over a control plane from the user equipment to at least one network entity of a communication system coupling the user equipment to the data network; and transmitting the generated control plane message from the user equipment to the at least one network entity of the communication system.

Example 19 relates to an apparatus comprising: at least one processor; at least one memory including computer program code; the at least one memory and the computer program code being configured to, with the at least one processor, cause the apparatus at least to: determine a size of user data to be transmitted from a data network to user equipment; responsive to determining that the size of the user data to be transmitted is below at least a first size threshold, generate a control plane message comprising the user data to be transmitted and specifying a designated payload container type reserved for transport of user data over a control plane to the user equipment from at least one network entity of a communication system coupling the user equipment to the data network; and transmit the generated control plane message to the user equipment from the at least one network entity of the communication system.

Example 20 relates to an apparatus of example 19, wherein the user equipment is in a connected mode and the generated control plane message comprises a downlink Non-Access Stratum (NAS) data transport message.

Example 21 relates to an apparatus of example 19, wherein the communication system comprises a 5G communication system and the data network comprises a Packet Data Network (PDN).

Example 22 relates to an apparatus of example 21, wherein the at least one network entity of the communication system comprises an Access and Mobility Management Function (AMF) of the 5G communication system.

Example 23 relates to an apparatus of example 22, wherein the apparatus provides the AMF of the 5G communication system.

Example 24 relates to an apparatus of example 23, wherein the at least one memory and the computer program code are further configured to, with the at least one processor, cause the apparatus to initiate a data transfer request from the AMF to a Session Management Function (SMF) of the 5G communication system for forwarding to at least one of a User Plane Function (UPF) and a Network Exposure Function (NEF) of the 5G communication system.

Example 25 relates to an apparatus of example 24, wherein the data transfer request forwarded to said at least one of the UPF and the NEF comprises a Packet Forwarding Control Protocol (PFCP) message.

Example 26 relates to a method comprising: determining a size of user data to be transmitted from a data network to user equipment; responsive to determining that the size of the user data to be transmitted is below at least a first size threshold, generating a control plane message comprising the user data to be transmitted and specifying a designated payload container type reserved for transport of user data over a control plane to the user equipment from at least one network entity of a communication system coupling the user equipment to the data network; and transmitting the generated control plane message to the user equipment from the at least one network entity of the communication system.

Example 27 relates to an article of manufacture comprising a non-transitory computer-readable storage medium having embodied therein executable program code that when executed by a processor operatively coupled to the computer-readable storage medium cause the processor to perform steps of: determining a size of user data to be transmitted from a data network to user equipment; responsive to determining that the size of the user data to be transmitted is below at least a first size threshold, generating a control plane message comprising the user data to be transmitted and specifying a designated payload container type reserved for transport of user data over a control plane to the user equipment from at least one network entity of a communication system coupling the user equipment to the data network; and transmitting the generated control plane message to the user equipment from the at least one network entity of the communication system.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A user equipment comprising:
   at least one processor; and
   at least one memory including executable program code;
   the at least one memory and the executable program code being configured to, with the at least one processor, cause the user equipment at least to:
      determine a size of user data to be transmitted over a control plane from the user equipment to at least one network entity of a communication system;
      in response to determining that the size of the user data to be transmitted is below at least a threshold for small data transport, generate a control plane message comprising the user data to be transmitted in a small data container over the control plane;
      in response to determining that the size of the user data is above the threshold for small data transport and below a threshold for large data transport, generate a control plane message comprising the user data to be transmitted and specifying a large data container dedicated to transport of large user data over the control plane; and
      transmit the generated control plane message from the user equipment to the at least one network entity of the communication system.

2. The user equipment of claim 1, wherein the at least one memory and the executable program code are configured to transmit the generated control plane message from the user equipment to the at least one network entity of the communication system for transmission of the user data via the at least one network entity to a data network.

3. The user equipment of claim 1, wherein the user equipment is part of an Internet of Things (IoT) device.

4. The user equipment of claim 1, wherein the user equipment is in an idle mode and the generated control plane message comprises a control plane service request message with a control plane service type set to indicate a user equipment-originating request.

5. The user equipment of claim 4, further comprising applying transport protection to one or more non-cleartext information elements of the generated control plane message, the transport protection comprising providing one or more non-cleartext information elements including the user data content of the data container in a separate Non-Access Stratum (NAS) message container, and applying ciphering to the value part of separate NAS message container utilizing a NAS security context of the user equipment.

6. The user equipment of claim 5, wherein the one or more information elements provided in the separate NAS message container comprise at least one of a payload container type information element, a payload container information element, a Protocol Data Unit (PDU) session identifier information element, a PDU session status information element, an uplink status information element, and a release assistance indication information element.

7. The user equipment of claim 1, wherein the user equipment is in a connected mode and the generated control plane message comprises an uplink Non-Access Stratum (NAS) data transport message.

8. The user equipment of claim 1, wherein generating the control plane message comprises generating a payload container type information element comprising:
   a payload container information element identifier associated with the small data container;
   an indication of a length of the user data to be transmitted;
   a Protocol Data Unit (PDU) session identifier;
   a release assistance indication specifying when the at least one network entity of the communication system should release a Non-Access Stratum (NAS) signaling connection for transmission of the user data between the at least one network entity and the user equipment; and
   the user data to be transmitted.

9. The user equipment of claim 8, wherein the release assistance indication comprises one of:
   an indication that the NAS signaling connection should be released subsequent to uplink transmission of the user data in the generated control plane message; and
   an indication that the NAS signaling connection should be released subsequent to uplink transmission of the user data in the generated control plane message and subsequent to a next downlink transmission to the user equipment.

10. The user equipment of claim 1, wherein generating the control plane message comprises:
   generating a payload container information element of a first format in response to determining that the size of the user data to be transmitted is below the threshold for large data transport and above the threshold for small data transport; and
   generating a payload container information element of a second format in response to determining that the size of the user data to be transmitted is below the threshold for large data transport and below the threshold for small data transport.

11. The user equipment of claim 10, wherein the payload container information element of the first format is a Cellular Internet of Things user data container, and wherein the payload container information element of the second format is a Cellular Internet of Things small data container information element.

12. The user equipment of claim 10, wherein the threshold for large data transport and the threshold for small data transport are defined in a Non-Access Stratum (NAS) management object (MO).

13. The user equipment of claim 10, wherein the payload container information element of the first format comprises one or more of the following:
   a first octet comprising a payload container information element identifier associated with the large data container;
   second and third octets comprising an indication of a length of the user data to be transmitted;
   a fourth octet comprising a Protocol Data Unit (PDU) session identifier and a release assistance indication; and
   a plurality of additional octets comprising the user data to be transmitted.

14. The user equipment of claim 10, wherein the payload container information element of the second format comprises:
   a first octet comprising a payload container information element identifier associated with the small data container;
   a second octet comprising an indication of a length of the user data to be transmitted;
   a third octet comprising a Protocol Data Unit (PDU) session identifier and a release assistance indication; and
   one or more additional octets comprising the user data to be transmitted.

15. The user equipment of claim 1, wherein the communication system comprises a 5G communication system and the data network comprises a Packet Data Network (PDN).

16. The user equipment of claim 15, wherein the at least one network entity of the communication system comprises an Access and Mobility Management Function (AMF) of the 5G communication system.

17. The user equipment of claim 1, wherein the threshold for small data transport is configured to have a value of 254 octets.

18. The user equipment of claim 1, wherein the at least one memory and the executable program code are further configured to, with the at least one processor, cause the user equipment to, in response to determining that the size of the user data to be transmitted is up to 254 octets, determine that the size of the user data to be transmitted is below the threshold for small data transport.

19. A method comprising:
   determining a size of user data to be transmitted over a control plane from user equipment to at least one network entity of a communication system;
   in response to determining that the size of the user data to be transmitted is below at least a threshold for small data transport, generating a control plane message comprising the user data to be transmitted in a small data container over the control plane;
   in response to determining that the size of the user data is above the threshold for small data transport and below a threshold for large data transport, generating a control plane message comprising the user data to be transmitted and specifying a large data container dedicated to transport of large user data over the control plane; and
   transmitting the generated control plane message from the user equipment to the at least one network entity of the communication system.

20. A computer program product comprising a non-transitory computer-readable storage medium having embodied therein executable program code that when executed by a processor operatively coupled to the computer-readable storage medium cause the processor to perform:
   determining a size of user data to be transmitted over a control plane from user equipment to at least one network entity of a communication system;
   in response to determining that the size of the user data to be transmitted is below at least a threshold for small data transport, generating a control plane message comprising the user data to be transmitted in a small data container over the control plane;
   in response to determining that the size of the user data is above the threshold for small data transport and below a threshold for large data transport, generating a control plane message comprising the user data to be transmitted and specifying a large data container dedicated to transport of large user data over the control plane; and
   transmitting the generated control plane message from the user equipment to the at least one network entity of the communication system.

* * * * *